United States Patent [19]

Ono

[11] Patent Number: 4,846,331

[45] Date of Patent: Jul. 11, 1989

[54] VALVE MEMBER OF TEMPERATURE SENSITIVE FLUID FAN COUPLING

[75] Inventor: Yuichi Ono, Numazu, Japan

[73] Assignee: Usui Kokusai Sangyo Kaisha Ltd., Sunto, Japan

[21] Appl. No.: 171,652

[22] Filed: Mar. 22, 1988

[30] Foreign Application Priority Data

Sep. 27, 1985 [JP] Japan .................................. 60-147365

[51] Int. Cl.$^4$ ............................................. F16D 35/00
[52] U.S. Cl. ................................ 192/58 B; 192/82 T; 192/103 C
[58] Field of Search ............... 192/58 B, 103 C, 82 T, 192/52, 103 R

[56] References Cited

U.S. PATENT DOCUMENTS

| 3,144,922 | 8/1964 | Weir | 192/58 B |
|---|---|---|---|
| 3,159,254 | 12/1964 | Weir | 192/58 B |
| 3,217,849 | 11/1965 | Weir | 192/82 T |
| 3,690,428 | 9/1972 | LaFlame | 192/58 B |
| 3,840,101 | 10/1974 | Peter et al. | 192/58 B |
| 4,437,554 | 3/1984 | Haeck | 192/58 B |
| 4,441,598 | 4/1984 | Sheperd | 192/58 B |
| 4,544,053 | 10/1985 | Yamaguchi et al. | 192/58 B |
| 4,570,771 | 2/1986 | Yamaguchi et al. | 192/58 B |
| 4,629,046 | 12/1986 | Martin | 192/58 B |

FOREIGN PATENT DOCUMENTS 57-1829  1/1982  Japan ................................ 192/82 T Primary Examiner—Rodney H. Bonck
Assistant Examiner—Richard M. Lorence
Attorney, Agent, or Firm—Anthony J. Casella; Gerald E. Hespos

[57] ABSTRACT

A valve member of a temperature sensitive fluid fan coupling for an engine cooling fan is formed from a plate material having a weight provided at its free end. The modulus of section of the longitudinally central portion of the plate material is reduced to impart flexibility thereto so that it is flexible in the direction of rotation. Accordingly, it is possible to enhance the effect of the action of the weight which causes the valve member to be displaced so as to cancel the pivotal displacement of the valve member caused by the displacement of a bimetal. Thus, it is possible to eliminate the discontinuity in the temperature sensitivity of the speed of rotation of the fan and hence lower the noise level, reduce the fuel consumption and minimize the change in temperature of cooling water.

8 Claims, 3 Drawing Sheets

VALVE MEMBER OF TEMPERATURE SENSITIVE FLUID FAN COUPLING

BACKGROUND OF THE INVENTION

1. Field of the Invention

The present invention generally relates to a fan for cooling an automotive engine. More particularly, the present invention pertains to a valve member of a temperature sensitive fluid fan coupling which has a fan member provided thereon such that the rotation thereof is controllable.

2. Description of the Prior Art

FIG. 3 shows a temperature sensitive fluid fan coupling of the type described above, which has already been proposed by the present inventor in the specification of Japanese Patent Laid-Open No. 60-241534 laid open on Nov. 30, 1985, in which FIG. 3(a) is a sectional view of the fan coupling, and FIG. 3(b) is a front view of a valve member thereof viewed from the front side of the a partition plate. As illustrated, the proposed temperature sensitive fluid fan coupling has a hermetically sealed casing consisting of a casing member 2 and a cover 3. The casing member 2 is supported through a bearing B on a rotary shaft 1 having a driving disk 7 rigidly secured to its distal end. The cover 3 has a cooling fan provided on the outer periphery thereof. The inside of the casing is partitioned by a partition plate 5 into an oil reservoir chamber 6 and a torque transmission chamber 4 which accommodates the driving disk 7, the partition plate 5 having an oil flow regulating bore 5'. The fluid fan coupling further has a dam 12 for controlling the oil when the driving disk 7 is rotating which dam 12 is defined between the peripheral wall portion of the disk 7 and a part of the wall surface of the casing which faces disk 7, and an oil circulating passage 13' which provides communication between the torque transmission chamber 4 and the oil reservoir chamber 6 through the dam 12. In addition, a valve member 8 is provided in the oil reservoir chamber 6 in such a manner as to be activated in respose to the action of a temperature sensitive member (bimetal) 10 caused by a temperature change, the bimetal 10 being provided on the front surface of the cover 3, so that the valve member 8 opens and closes the oil flow regulating bore 5' provided in the partition plate 5 in accordance with a change in the ambient temperature. Thus, the transmission of torque from the driving (rotary shaft) side to the driven side is controlled by varying the effective opening area for flow of oil at the dam 12 defined between the facing wall surfaces of the driving disk 7 and the casing member 2 and at the oil flow regulating bore 5'. Further, a weight 19 is provided either directly or indirectly at the free end of the valve member 8 so that the degree of opening of the oil flow regulating bore 5' is decreased as the speed of rotation of the driven side rises. It should be noted that the reference numeral 1' denotes a flange, 9 a bimetal shaft, 11 a support member, 13 an inlet port, 15 an outlet port, 16 a partition wall, 17, 17' cooling fins, and 18, 18' fan securing bolt holes.

The valve member having the above-described arrangement enables elimination of the discontinuous change in the speed of rotation of the fan, that is, the problem that the rotation speed of the fan may change abruptly despite no change in temperature in the case where the degree of opening of the oil feed port is controlled by the displacement of the bimetal only. However, there are still some cases where the above-described problem cannot be sufficiently overcome simply by providing a weight on the valve member.

SUMMARY OF THE INVENTION

Accordingly, it is a primary object of the present invention to provide a valve member of a temperature sensitive fluid fan coupling which is further improved so that the discontinuous change in the speed of rotation of the fan is completely eliminated.

To this end, according to the present invention, flexibility is imparted to the valve member so that it is flexible in the direction of rotation in order to enhance its sensitivity to the action of the weight.

By virtue of this arrangement, it is possible to enhance the effect of the weight action which causes the valve member to be displaced in a direction in which the pivotal displacement of the valve member caused by the displacement of the bimetal is canceled.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which:

FIG. 1b is a side view of the embodiment shown in FIG. 1a;

FIG. 2b is a side view of the embodiment shown in FIG. 2a;

DETAILED DESCRIPTION OF PREFERRED EMBODIMENTS

The present invention will be described hereinunder in detail with reference to the accompanying drawings.

Figure 1A:
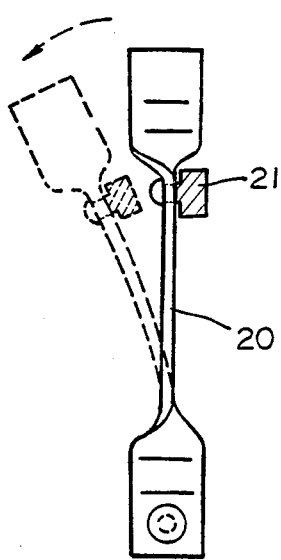
FIG. 1a is a front view of one embodiment of the valve member according to the present invention.
Figure 1B:
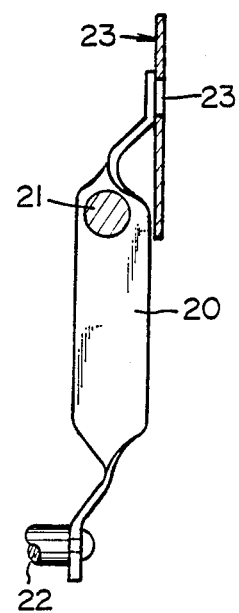
Figure 4:
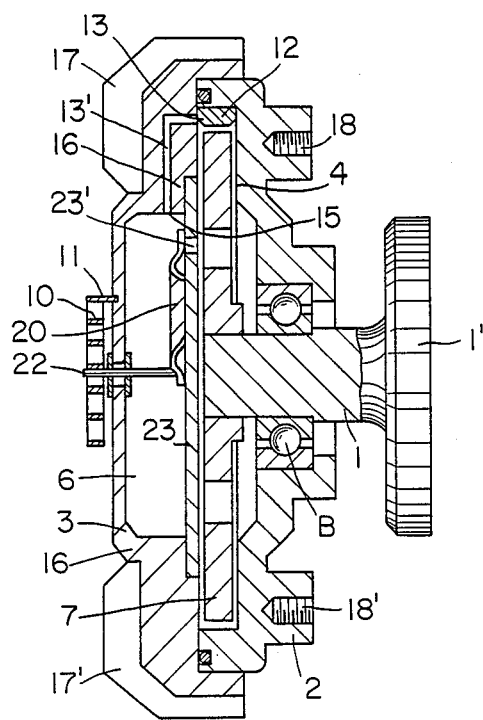
FIG. 4 is a cross sectional view of a temperature sensitive fluid fan coupling incorporating the value member of FIGS. 1a and 1b.

Referring to FIGS. 4, 1a and 1b, which show in combination one embodiment of the present invention, a valve member body 20 which is the form of a plate has its longitudinally central protion twisted 90° at each of the two positions to reduce the modulus of section in order to impart flexibility to the valve member body 20 so that it is flexible in the direction of rotation. It should be noted that the reference numeral 21 denotes a weight, 22 a bimetal shaft, 23 a partition plate, and 23' an oil flow regulating bore.

The valve member body 20 is rigidly secured to the shaft 22 which turns in response to the displacement of the bimetal. Accordingly, the valve member body 20 performs pivotal motion in response to the displacement of the bimetal. On the other hand, the weight 21 which is provided on the distal end portion of the valve member body 20 cooperates with the flexibility of the valve member body 20 to act so as to cancel the pivotal displacement (shown by the chain line in FIG. 1a) of the valve member caused by the displacement of the bimetal as the speed of rotation of the fan increases. Accordingly, it is possible to make a further improvement in elimination of the discontinuous change in the rotational speed of the fan.

Figure 2A:
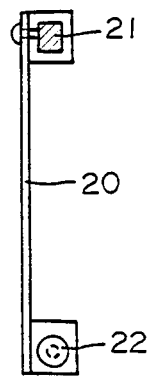
FIG. 2a is a front view of another embodiment.
Figure 2B:
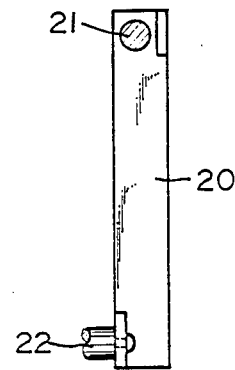
Figure 3A:
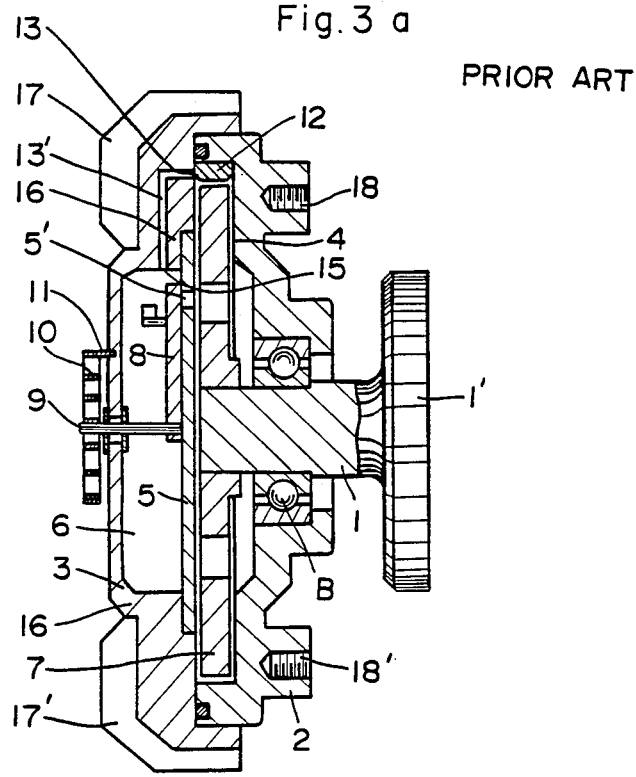
FIG. 3a is a sectional view of a conventional temperature sensitive fluid fan coupling.
Figure 3B:
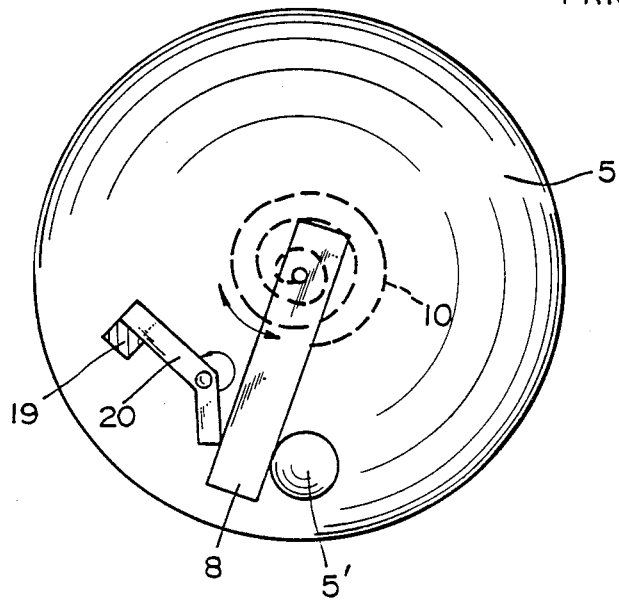
FIG. 3b is a front view of the valve member of the fluid fan coupling shown in FIG. 3a which is viewed from the front side of the partition plate.

FIGS. 2a and 2b show in combination another embodiment of the present invention, in which each end portion of a plate material is bent 90° in order to reduce the section modulus of the longitudinally central portion of the valve member. It is possible with this structure also to obtain the same advantageous effect as that in the first embodiment.

As has been described above in detail, according to the present invention, the section modulus of the longitudinally central portion of the valve member is reduced to impart flexibility thereto so that the valve member is flexible in the direction of rotation. Therefore, it is advantageously possible to eliminate the discontinuity in the temperature sensitivity of the speed of rotation of the fan and hence lower the noise level, reduce the fuel consumption and minimize the change in temperature of cooling water.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A temperature sensitive fluid fan coupling which includes: a partition plate partitioning the inside of a hermetically sealed casing into an oil reservoir chamber and a torque transmission chamber which accommodates a driving disk, said plate having an oil flow regulating bore; a dam disposed between a peripheral wall portion of said driving disk and a part of said casing which faces said peripheral wall portion, said dam collecting oil when said disk is rotating; an oil circulating passage which provides communication between said torque transmission chamber and said oil reservoir chamber through said casing; and a valve member defined by a plate material which opens and closes said oil flow regulating bore, said plate material being secured to a shaft having a longitudinal axis and which is caused to turn about its axis by the action of a bimetal which is displaced in accordance with a change in ambient temperature such that the turning of said shaft moves said valve member to selectively open and close the oil flow regulating bore, so that the transmission of torque from a rotary shaft to the hermetically sealed casing is controlled by varying oil flow through said oil flow regulating bore, wherein said plate material has a weight provided at its free end and has a flexibility in the direction of rotation sufficient to enable said valve member to be displaced in the direction of rotation an amount to cancel the movement of the valve member caused by the turning of the shaft, whereby the flexibility of the valve member enables the valve member to move in response to changes in rotational speed of the casing and thereby reduces discontinuous changes in rotational speed of the casing.

2. A temperature sensitive fluid fan coupling according to claim 1, wherein said plate material has a modulus of section reduced at at least its longitudinally central portion as compared to moduli of section at opposed ends of said plate material to thereby impart the flexibility thereto.

3. A temperature sensitive fluid fan coupling according to claim 1, wherein said plate material has its longitudinally central portion twisted substantially 90° at each of two spaced apart positions, the longitudinally central portion being oriented to provide the flexibility of the valve member.

4. A temperature sensitive fluid fan coupling according to claim 2, wherein said plate material is bent substantially 90° at each each longitudinal end portion thereof to define the increased modulus of section at each said end relative to the longitudinally central portion of said plate material.

5. A temperature sensitive fluid fan coupling which includes: a partition plate partitioning the inside of a hermetically sealed casing into an oil reservoir chamber and a torque transmission chamber which accommodates a driving disk, said plate having an oil flow regulating bore; a dam disposed between a peripheral wall portion of said driving disk and a part of said casing which faces said peripheral wall portion, said dam collecting oil when said disk is rotating; an oil circulating passage which provides communication between said torque transmission chamber and said oil reservoir chamber through said casing; and a valve member defined by a plate material which opens and closes said oil flow regulating bore, said plate material being secured to a shaft which is caused to turn by the action of a bimetal which is displaced in accordance with a change in the ambient temperature, so that the transmission of torque from a rotary shaft to the hermetically sealed casing on the driven side is controlled by varying flow through the oil flow regulating bore, said plate material having a weight provided at its free end, said plate material including a longitudinally central portion twisted substantially 90° at each of two positions, said central portion between said twists being oriented to provide flexibility of said plate material in the direction of rotation.

6. A temperature sensitive fluid fan coupling which includes: a partition plate partitioning the inside of a hermetically sealed casing into an oil reservoir chamber and a torque transmission chamber which accommodates a driving disk, said plate having an oil flow regulating bore; a dam disposed between a peripheral wall portion of said driving disk and a part of said casing which faces said peripheral wall portion, said dam collecting oil when said disk is rotating; an oil circulating passage which provides communication between said torque transmission chamber and said oil reservoir chamber through said casing; and a valve member defined by a plate material which opens and closes said oil flow regulating bore, said plate material being secured to a shaft which is caused to turn by the action of a bimetal which is displaced in accordance with a change in the ambient temperature, so that the transmission of torque from a rotary shaft to the hermetically sealed casing on the driven side is controlled by varying flow through said oil flow regulating bore, said valve member having a weight provided at its free end, said plate material defining a modulus of section at a longitudinally central portion along its length which is less than moluli of section existing adjacent the free end of the valve member and the end thereof secured to the shaft, said longitudinally central portion of said valve member being oriented to provide flexibiltiy in the direction of rotation.

7. A temperature sensitive fluid fan coupling as in claim 6 wherein the plate material is bent substantially 90° at each longitudinal end portion thereof to provide said end portions with said greater moduli of section than said longitudinally central portion.

8. A temperature sensitive fluid fan coupling which includes: a partition plate partitioning the inside of a hermetically sealed casing into an oil reservoir chamber and a torque transmission chamber which accommodates a driving disk, said plate having an oil flow regulating bore; a dam disposed between a peripheral wall portion of said driving disk and a part of said casing which faces said peripheral wall portion, said dam collecting oil when said disk is rotating; an oil circulating passage which provides communication between said torque transmission chamber and said oil reservoir chamber through said casing; and a valve member defined by a plate material which opens and closes said oil flow regulating bore, said plate material being secured to a shaft which is caused to turn by the action of a bimetal which is displaced in accordance with a change in the ambient temperature, so that the transmission of torque from a rotary shaft to the hermetically sealed casing is controlled by varying flow through said oil flow regulating bore, said plate material being generally perpendicular to the axis of said shaft at the end of the plate material attached to said shaft, portions of said plate material spaced from said shaft being generally perpendicular to the end attached to the shaft to provide said plate material with increased flexibility in the direction of rotation at locations thereon spaced from said shaft, said plate material having a weight generally at its free end.

* * * * *